(12) United States Patent
Wu et al.

(10) Patent No.: US 8,581,164 B2
(45) Date of Patent: Nov. 12, 2013

(54) LIGHT SENSING SYSTEM AND METHOD OF DRIVING THE SAME

(75) Inventors: Jiunn-Chi Wu, Taoyuan County (TW);
Pi-Cheng Tung, Taoyuan County (TW);
Yan-Bin You, Taoyuan County (TW)

(73) Assignee: National Central University, Taoyuan County (TW)

( * ) Notice: Subject to any disclaimer, the term of this patent is extended or adjusted under 35 U.S.C. 154(b) by 358 days.

(21) Appl. No.: 12/884,634

(22) Filed: Sep. 17, 2010

(65) Prior Publication Data
US 2011/0278433 A1 Nov. 17, 2011

(30) Foreign Application Priority Data
May 13, 2010 (TW) .............................. 99115358 A

(51) Int. Cl.
*G01C 21/02* (2006.01)
*G01C 21/24* (2006.01)
*G01J 1/20* (2006.01)

(52) U.S. Cl.
USPC ................... 250/203.4; 356/139.01; 136/573

(58) Field of Classification Search
USPC ............ 250/203.1–203.4, 206.1; 356/139.01, 356/139.02; 136/246; 126/573–578
See application file for complete search history.

(56) References Cited

U.S. PATENT DOCUMENTS 4,041,307 A * 8/1977 Napoli et al. ............... 250/203.4
4,225,781 A * 9/1980 Hammons .................. 250/203.4

* cited by examiner

*Primary Examiner* — Francis M Legasse, Jr.
(74) *Attorney, Agent, or Firm* — WPAT, P.C.; Anthony King

(57) ABSTRACT

The present invention discloses a light sensing system and a control method thereof. The light sensing system comprises a body, a plurality of first light sensors, a base, a plurality of second light sensors and a processing module. A through hole is disposed on the body. The first light sensors are disposed symmetrically on the body and generating a plurality of first sensing signal after sensing lights correspondingly. The base is arranged under the body. The second light sensors are disposed symmetrically on the base, while the geometric center of the second light sensors corresponds to the geometric center of the through hole. The second light sensors generating a plurality of second sensing signals correspondingly after sensing lights via the through hole. The processing module connects to the first and the second light sensors, and controls the light sensing system according to the first and the second sensing signals.

10 Claims, 5 Drawing Sheets

LIGHT SENSING SYSTEM AND METHOD OF DRIVING THE SAME

FIELD

The exemplary embodiment(s) of the present invention relates to a field of light sensing system and a control method thereof. More specifically, the exemplary embodiment(s) of the present invention relates to a light sensing system and a control method thereof applied for a sun-tracking system in a concentrating photovoltaic.

BACKGROUND

Among the conventional photovoltaic systems, the concentrating photovoltaic (CPV) could focus the sun light on the solar cells through optical devices so as to decrease the area of the solar cells and lower the cost of power generation. However, the concentrating photovoltaic is very sensitive to the incident angle of the sunlight. In order to focus the sun light on the solar cells correctly, the sun-tracker is used to adjust the light axis of the light-concentrating module facing sun directly. Whereas, the area of the high-concentration photovoltaic (the light concentration ratio is more than 500-fold) is further decreased, so the light-concentrating module has little tolerance to the angle deviation of the sun-tracker, and the accuracy of the sun-tracker is getting more and more important.

In the concentrating photovoltaic systems, usually pluralities of sensors are needed to cooperate with the sun-tracker. The sensors could be classified into two categories by their view angle: one is the wide view angle type and the other is the narrow view angle type. Because each sensor is disposed at different positions, the wide view angle type of sensors could generate different voltage output corresponding to the non-uniform light sensed by the sensors, and the direction of the strongest sunlight could be determined according to the voltage values. The main application of the wide view angle type of sensors is active tracking. The advantages of the wide view angle type of sensors are wide view angle, and the strongest sunlight still could be determined even when the weather is bad or sun is sheltered by clouds. However, the disadvantage of the wide view angle type of sensors is low accuracy, and the angle deviation from the strongest light, thus could not be projected or calculated. On the other hands, the narrow view angle type of sensors could accurately project or calculate the angle deviation of the sunlight by using the optical properties and the space geometry relationship, and the main applications of the narrow view angle type of sensors are recording the sunlight deviation angle, or correcting the initial assembling errors during the sun trajectory tracking. However, the disadvantages of the narrow view angle type of sensors are small view angle and the low accuracy when the weather is bad or the sun is sheltered by clouds.

In summary, the function of the conventional sensors is relatively simple, and common photovoltaic systems usually need different kinds of light sensors when operate different sun-tracking. Besides, different kinds of situation needs different kinds of sensors to deal with, for example, the wide view angle type of sensors could be operated under bad weather or cloudy situation, but the accuracy is too low and the angle deviation from the strongest sunlight could not be determined. At this time, if we want to determine the tracking performance, we need to accumulate the tracking data for a long time or install extra sensors with higher accuracy, and this causes the inconvenience and cost up when use the photovoltaic systems to generate electric power.

SUMMARY

To solve the problems in the conventional arts, it is a primary object of the present invention to provide a light sensing system and a control method thereof to solve the problem that the cost of the concentrating photovoltaic is too high due to the low performance of the sun tracker.

To achieve the above object, a light sensing system according to the present invention is discloses, which comprises a body, a plurality of first light sensors, a base, a plurality of second light sensors and a processing module. In addition, a through hole penetrates the top of the body, and the first light sensors are symmetrically disposed on the body and correspondingly generating a plurality of first sensing signals after sensing lights. The base is arranged under the body, and the second light sensors are disposed symmetrically on the base, and the geometric center of the second light sensors corresponds to the geometric center of the through hole. The second light sensors generate a plurality of second sensing signals correspondingly after sensing lights via the through hole. The processing module connects to the first light sensors and the second light sensors, and controls the light sensing system according to the first sensing signals and the second sensing signals.

Wherein the light sensing system further comprises a driving module connected to the base, and the driving module is controlled by the processing module to drive the base so as to further drive the light sensing system.

Wherein the body is pyramidal or cylindrical.

Wherein the number of the first light sensors is four.

Wherein the number of the second light sensors is four.

To achieve another object, a light sensing system control method according to the present invention comprises is disclosed. The light sensing system comprises a body, a plurality of first light sensors, a base, a plurality of second light sensors and a processing module. A through hole penetrates the top of the body, and the first light sensors are symmetrically disposed on the body. The base is arranged under the body, and the second light sensors are symmetrically disposed on the base. The geometric center of the second light sensors corresponds to the geometric center of the through hole. The light sensing system control method comprises the following steps of: generating a plurality of first sensing signals correspondingly by the first light sensors after sensing lights; controlling the light sensing system according to the first sensing signals by the processing module; generating a plurality of second sensing signals correspondingly by the second light sensors after sensing lights via the through hole; and controlling the light sensing system according to the second sensing signals by the processing module.

Wherein the light sensing system further comprises a driving module connected to the base, and the driving module is controlled by the processing module to drive the base so as to further drive the light sensing system.

Wherein the body is pyramidal or cylindrical.

Wherein the number of the first light sensors is four.

Wherein the number of the second light sensors is four.

With the above arrangements, the light sensing system and the control method thereof according to the present invention has the following advantage:

This light sensing system and control method thereof could execute all kinds of sun-tracking by assembling a plurality of sensors, thus the light sensing system and control method thereof are not limited by the view angle or the weather, so as to effectively record the angle deviations of sun.

With these and other objects, advantages, and features of the invention that may become hereinafter apparent, the nature of the invention may be more clearly understood by reference to the detailed description of the invention, the embodiments and to the several drawings herein.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Exemplary embodiments of the present invention are described herein in the context of an illuminating system and a method thereof.

Those of ordinary skilled in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

Figure 1:
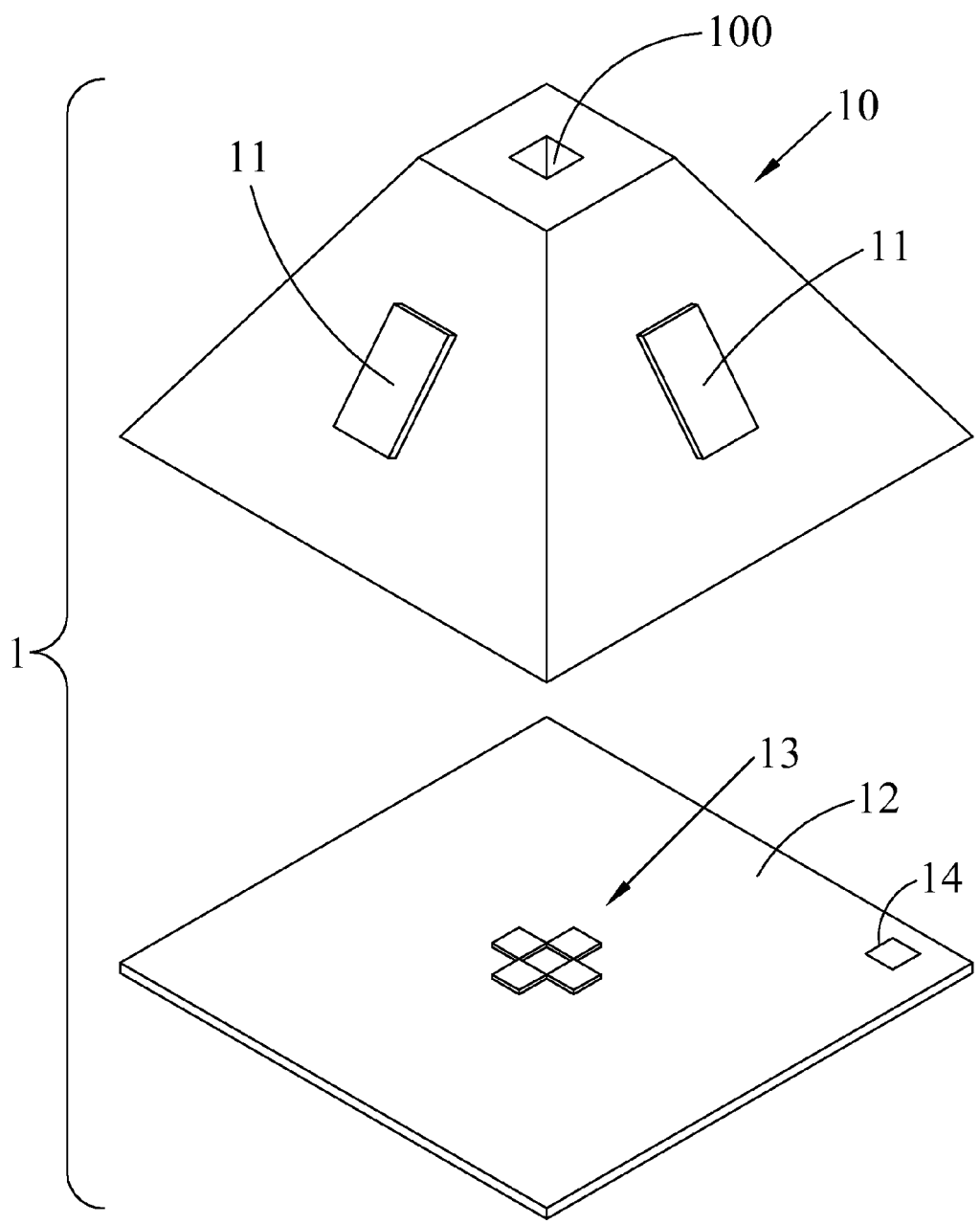
FIG. 1 illustrates a schematic diagram of a first embodiment of a light sensing system in accordance with the present invention.
Figure 2:
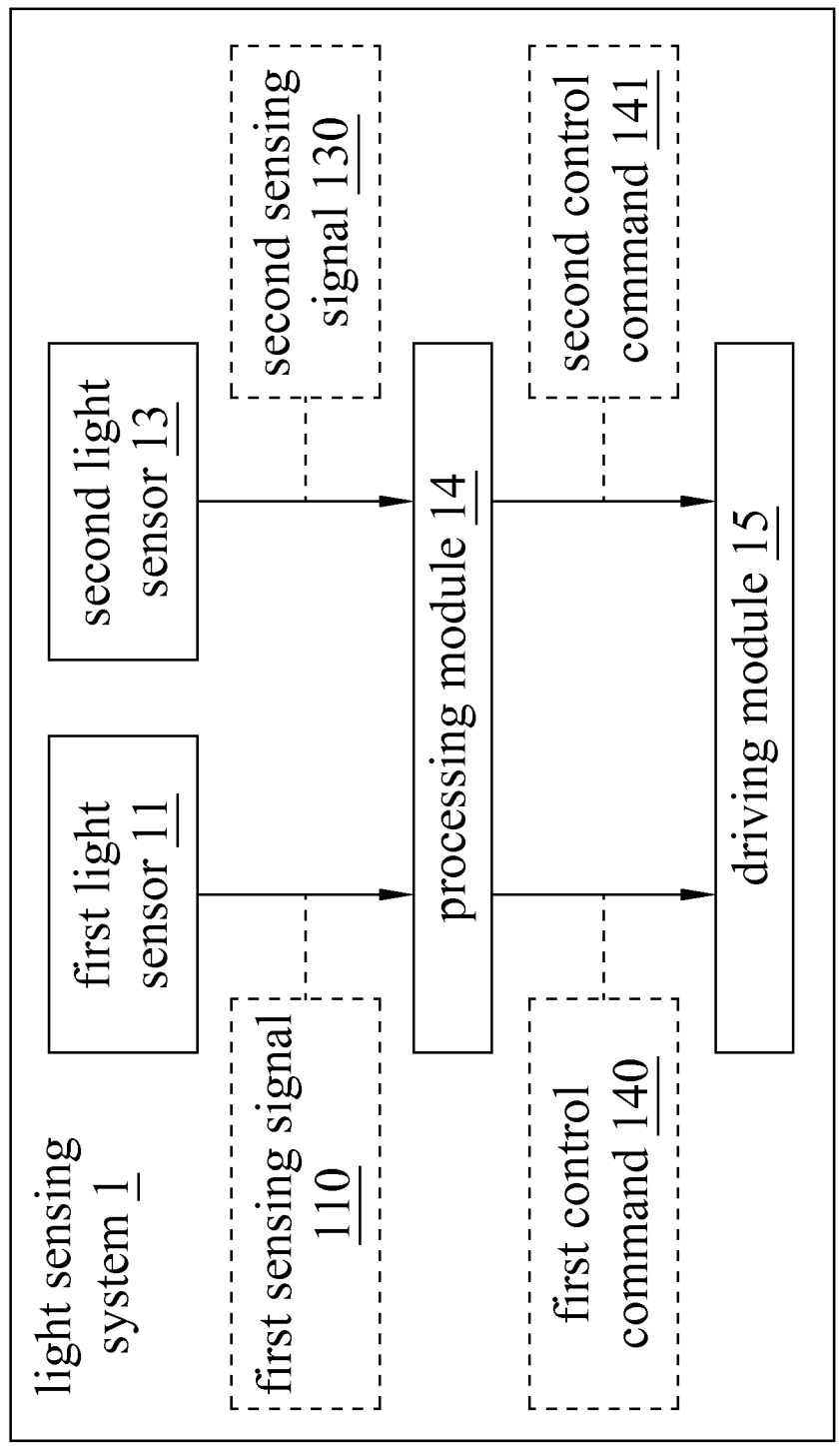
FIG. 2 illustrates a block diagram of a light sensing system in accordance with the present invention.

Please refer to FIG. 1 and FIG. 2, which illustrate a schematic diagram of a first embodiment and a block diagram of a light sensing system in accordance with the present invention. As shown in FIG. 1, the light sensing system 1 according to the present invention comprises a body 10, a plurality of first light sensors 11, a base 12, a plurality of second light sensors 13 and a processing module 14. In addition, a through hole 100 penetrates the top of the body 10, and the first light sensors 11 are symmetrically disposed on the body 10 and correspondingly generating a plurality of first sensing signals 110 after sensing lights. The base 12 is arranged under the body 10, and the second light sensors 13 are disposed symmetrically on the base 12, and the geometric center of the second light sensors 13 corresponds to the geometric center of the through hole 100. The second light sensors 13 generate a plurality of second sensing signals 130 correspondingly after sensing lights via the through hole 100. The processing module 14 connects to the first light sensors 11 and the second light sensors 13, and controls the light sensing system 1 according to the first sensing signals 110 and the second sensing signals 130. In some preferred embodiments, the light sensing system 1 further comprises a driving module 15 connected to the base 12, and the driving module 15 is controlled by the processing module 14 to drive the base 12 so as to further drive the light sensing system 1. In detail, after receiving the first sensing signals 110, the processing module 14 generates a first command signal 140 to control the driving module 15 to drive the base 12 and so as to drive the whole light sensing system 1; similarly, after receiving the second sensing signals 130, the processing module 14 generates a second command signal 141 to control the driving module 15 to drive the base 12 and so as to drive the whole light sensing system 1.

Figure 3:
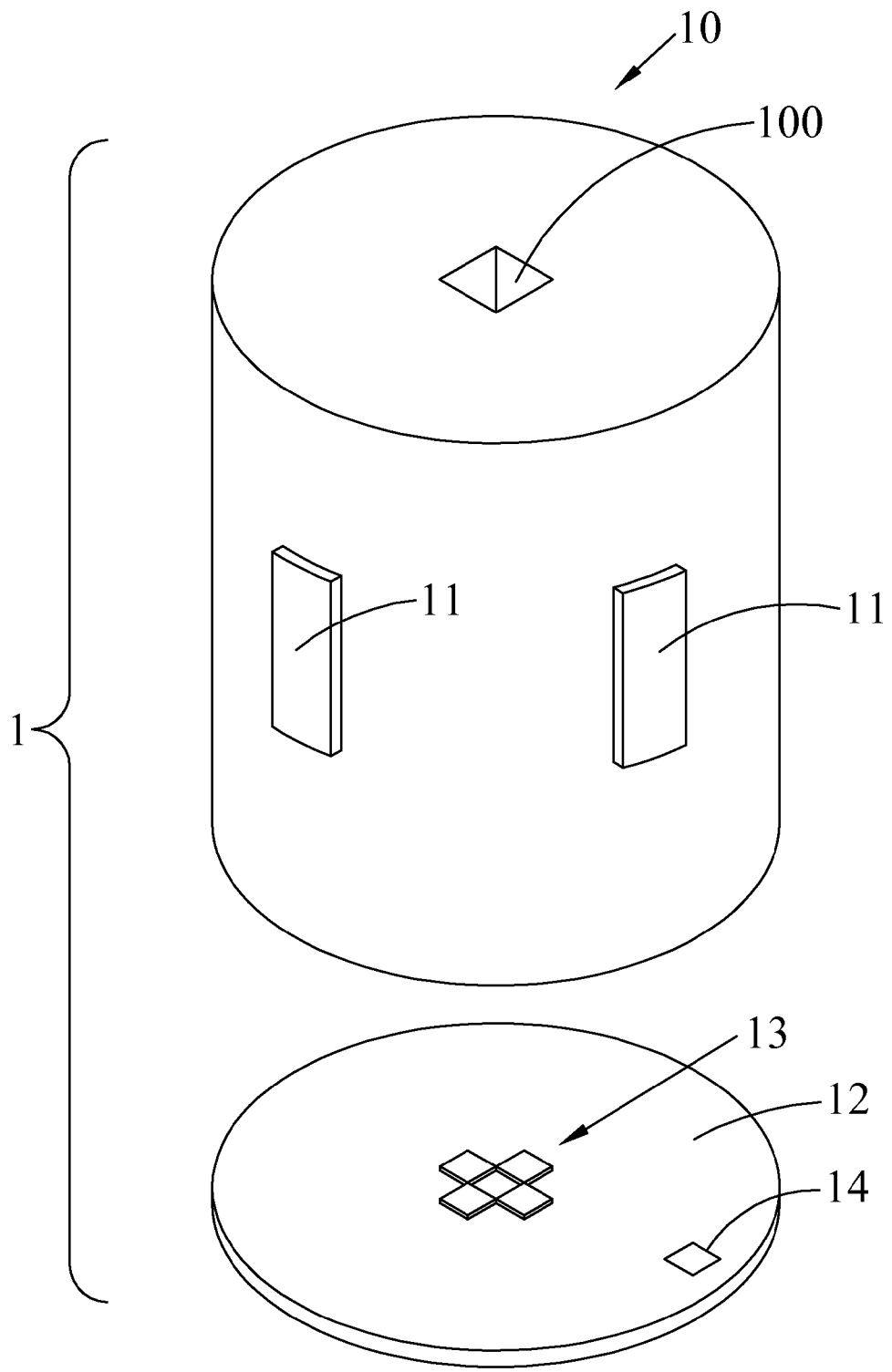
FIG. 3 illustrates a schematic diagram of a second embodiment of a light sensing system in accordance with the present invention.

In some preferred embodiments, the body 10 is pyramidal (as shown in FIG. 1) or cylindrical (as shown in FIG. 3), the number of the first light sensors 11 and the second light sensors 12 is four, and the cross-section of the through hole 100 is square. The four symmetric faces of the body 10 are installed with the first light sensors 11, and the second light sensor 13 are disposed on the base 12 around the position corresponding to the geometric center of the through hole 100. When the strongest light deviates a lot from the light sensing system 1, due to the different amount of the incident light sensed by first light sensor 11, different voltages (i.e., the first sensing signals) are generated. At this time, the processing module 14 could determine the direction of the strongest light according to the voltage difference between these voltages, and correspondingly generate the first command signal 140 to control the driving module 15 to drive the base 12 so as to further drive the light sensing system 1 turning to the direction of the strongest light. When the light and the light sensing system 1 are substantially perpendicular, the light amount sensed by each first light sensor 11 will be the same, so there is no voltage difference between the voltage signals generated by the first light sensors 11 after sensing the lights, and the processing module stop controlling the driving module 15 to drive the light sensing system 1.

Figure 4:
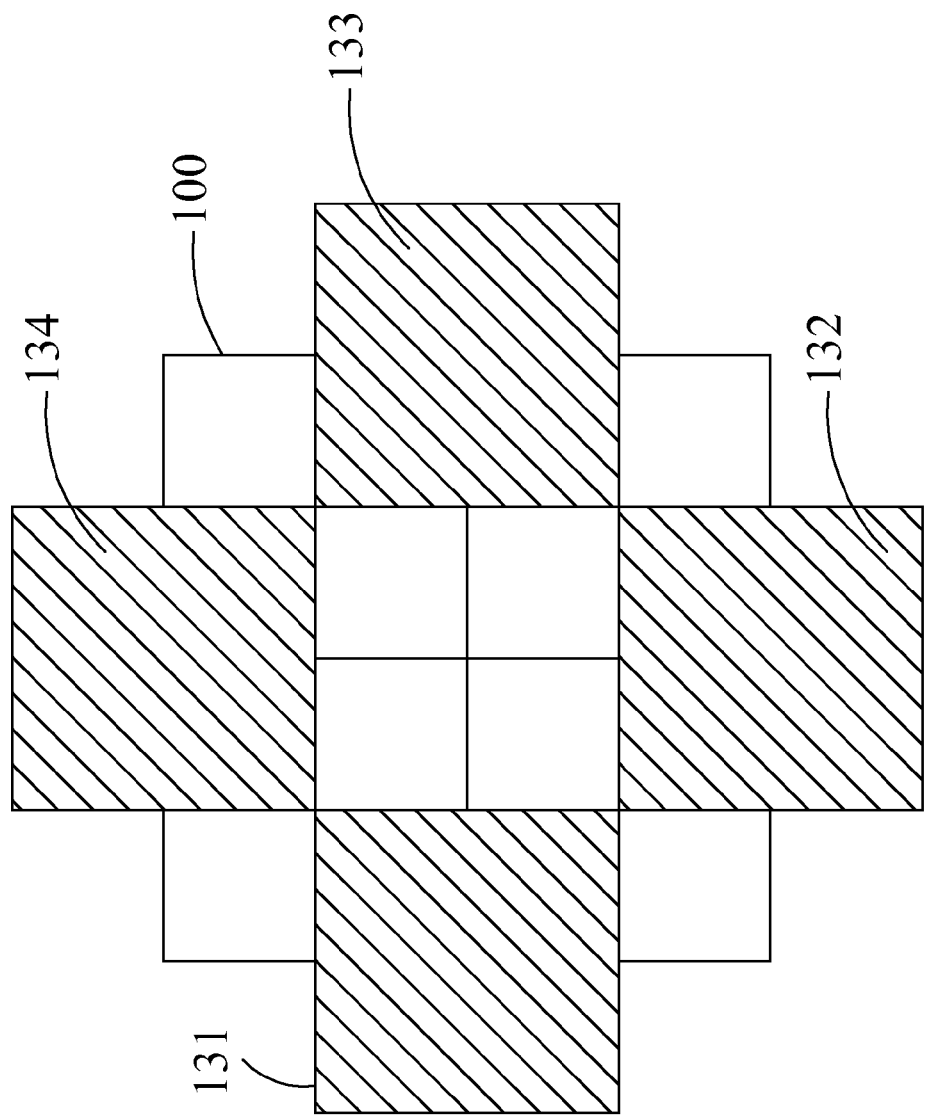
FIG. 4 illustrates a schematic diagram of the arrangement of the second light sensors in accordance with the present invention.

In the meanwhile, please refer to FIG. 4, which illustrates a schematic diagram of the arrangement of the second light sensors in accordance with the present invention. As shown in this figure, the second light sensor 131, 132, 133, 134 are squares, the length of each side of the squares is W. If the height from the top of the body 10 to the base 12 is H, then when the sunlight is perpendicular with the light sensing system 1, the illuminated area of the second light sensor 131, 132, 133, 134 will be $W^2/2$. When the sun deviates toward the second light sensor 133, the illuminated area of the second light sensor 131 will be $W^2/2+WH\tan(\theta)$, and the second light sensor 131 outputs a current $I_1$ (i.e., one of the second sensing signal); meanwhile, the illuminated area of the second light sensor 133 will be $W^2/2-WH\tan(\theta)$, and the second light sensor 133 outputs a current $I_2$ (i.e. another second sensing signal). By $I_1/I_2=[W^2/2+WH\tan(\theta)]/[W^2/2-WH\tan(\theta)]$, we can get $\tan(\theta)=[W(I_1-I_2)]/[2H(I_1+I_2)]$, thus the deviation angle between the light sensing system 1 and the sun could be determined. So, when the deviation between the strongest light of the sunlight and the second light sensors is smaller than the sensing range of the base 12, the deviation could be estimated according to the afore-described method.

The concept of the light sensing system control method in accordance to the present invention is simultaneously described in the description of the light sensing system disclosed in the present invention, but in order to get clearer, the following will still illustrate the flow chart of the light sensing system control method.

Figure 5:
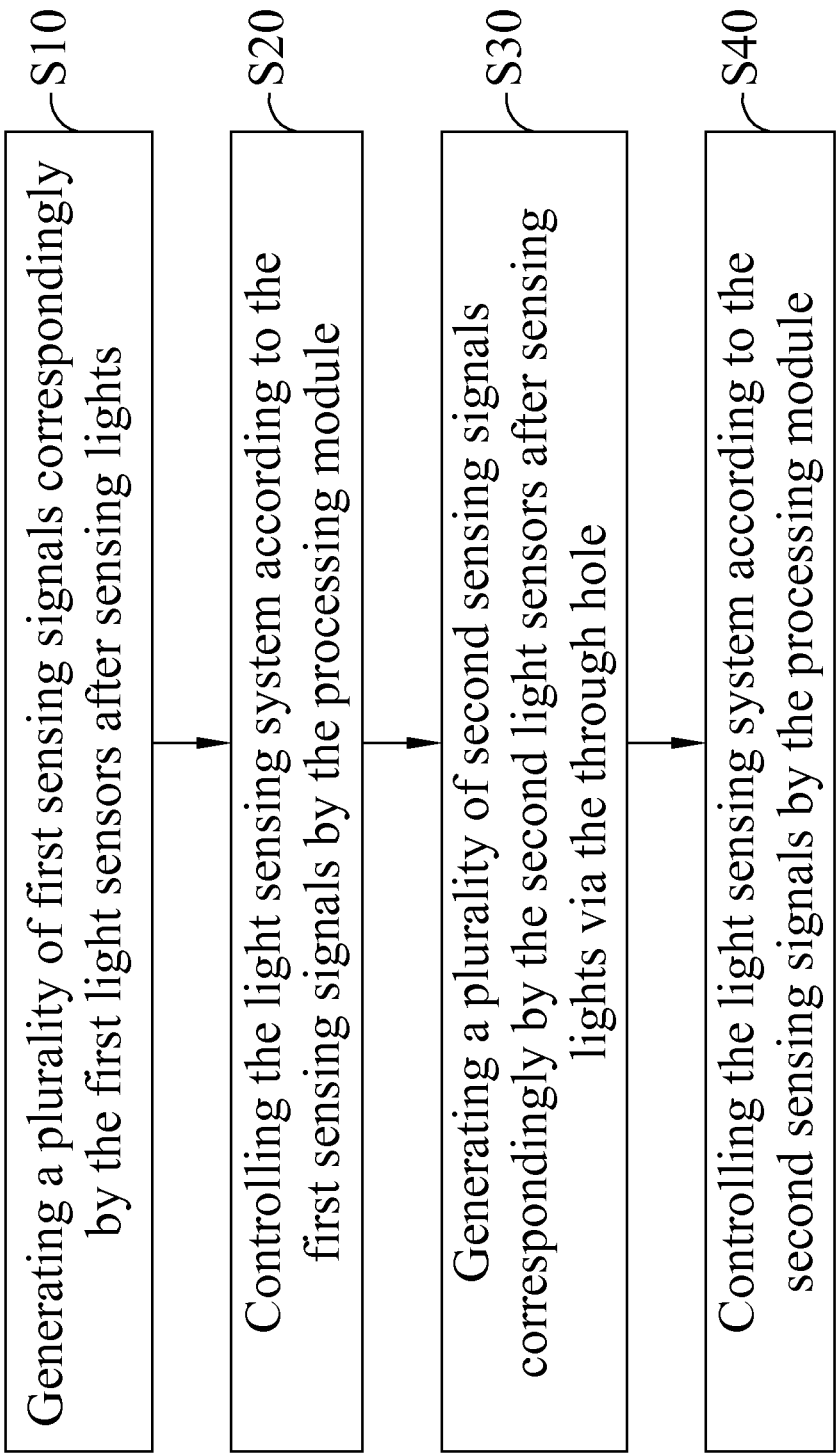
FIG. 5 illustrates a flow chart of a light sensing system control method in accordance with the present invention.

Please refer to FIG. 5, which illustrates a flow chart of a light sensing system control method in accordance with the present invention. The light sensing system control method is applicable to a light sensing system, and the light sensing system comprises a body, a plurality of first light sensors, a base, a plurality of second light sensors and a processing module. A through hole penetrates the top of the body, and the first light sensors are symmetrically disposed on the body. The base is arranged under the body, and the second light sensors are symmetrically disposed on the base. The geometric center of the second light sensors corresponds to the geometric center of the through hole. As shown in this figure, The light sensing system control method comprises the following steps of: (S10) generating a plurality of first sensing signals correspondingly by the first light sensors after sensing lights; (S20) controlling the light sensing system according to the first sensing signals by the processing module; (S30) generating a plurality of second sensing signals correspondingly by the second light sensors after sensing lights via the through hole; and (S10) controlling the light sensing system according to the second sensing signals by the processing module.

The implementation of the light sensing system control method in accordance with the present invention has already described in the description of the embodiments of the light sensing system according to the present invention, so it will not be stated here again.

In summary, this light sensing system and control method thereof could execute all kinds of sun-tracking by assembling a plurality of sensors, thus the light sensing system and control method thereof are not limited by the view angle or the weather, so as to effectively record the angle deviations of sun.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiment(s) of the present invention.

What is claimed is:

1. A light sensing system, comprising:
a body, formed as stereoscopic, the body having a through hole penetrating a top of the body;
a plurality of first light sensors, symmetrically disposed on the body and correspondingly generating a plurality of first sensing signals after sensing lights, wherein each of the first light sensors is faced to a sensing direction respectively by the shape of the body blocking;
a base, arranged under the body;
a plurality of second light sensors, disposed symmetrically on the base, the geometric center of the second light sensors corresponding to the geometric center of the through hole, and the second light sensors generating a plurality of second sensing signals correspondingly after sensing lights passing through the through hole directly, wherein the second sensing signals are related to a deviation angle of lights passing through the through hole; and a processing module, connecting to the first light sensors and the second light sensors, controlling the light sensing system towards to one of the sensing directions according to the first sensing signals, calculating the deviation angle according to a ratio of each pair of the second sensing signals disposed symmetrically, and further controlling the light sensing system according to the deviation angle.

2. The light sensing system of claim 1, wherein the light sensing system further comprises a driving module connected to the base, and the driving module is controlled by the processing module to drive the base so as to further drive the light sensing system.

3. The light sensing system of claim 1, wherein the body is pyramidal or cylindrical.

4. The light sensing system of claim 1, wherein the number of the first light sensors is four.

5. The light sensing system of claim 1, wherein the number of the second light sensors is four.

6. A method of driving a light sensing system, applicable to the light sensing system comprising a body formed as stereoscopic, a plurality of first light sensors, a base, a plurality of second light sensors and a processing module, a through hole penetrating the top of the body, the first light sensors being symmetrically disposed on the body, each of the first light sensors faced to a sensing direction respectively by the shape of the body blocking, the base being arranged under the body, the second light sensors being disposed symmetrically on the base, and the geometric center of the second light sensors corresponding to the geometric center of the through hole, the method comprising the following steps of:
generating a plurality of first sensing signals correspondingly by the first light sensors after sensing lights;
controlling the light sensing system towards to one of the sensing directions according to the first sensing signals by the processing module;
generating a plurality of second sensing signals correspondingly by the second light sensors after sensing lights passing through the through hole directly, wherein the second sensing signals are related to a deviation angle of lights passing through the through hole;
calculating the deviation angle according to a ratio of each pair of the second sensing signals disposed symmetrically; and
further controlling the light sensing system according to the deviation angle.

7. The method of claim 6, wherein the light sensing system further comprises a driving module connected to the base, and the driving module is controlled by the processing module to drive the base so as to further drive the light sensing system.

8. The method of claim 6, wherein the body is pyramidal or cylindrical.

9. The method of claim 6, wherein the number of the first light sensors is four.

10. The method of claim 6, wherein the number of the second light sensors is four.

* * * * *